(12) United States Patent
Jahnke et al.

(10) Patent No.: US 9,292,086 B2
(45) Date of Patent: Mar. 22, 2016

(54) CORRELATING PUPIL POSITION TO GAZE LOCATION WITHIN A SCENE

(71) Applicant: Grinbath, LLC, Lubbock, TX (US)

(72) Inventors: Nathan A. Jahnke, Lubbock, TX (US); J. Brian Still, Wolfforth, TX (US)

(73) Assignee: Grinbath, LLC, Lubbock, TX (US)

( * ) Notice: Subject to any disclaimer, the term of this patent is extended or adjusted under 35 U.S.C. 154(b) by 66 days.

(21) Appl. No.: 14/023,780

(22) Filed: Sep. 11, 2013

(65) Prior Publication Data

US 2014/0085204 A1    Mar. 27, 2014

Related U.S. Application Data

(60) Provisional application No. 61/705,724, filed on Sep. 26, 2012.

(51) Int. Cl.
*G06F 3/01* (2006.01)

(52) U.S. Cl.
CPC ..................... *G06F 3/013* (2013.01)

(58) Field of Classification Search
CPC .. G06F 3/013; G06K 9/00597; G02B 27/017; G02B 2027/0187; G02B 2027/0138; G02B 2027/014; G02B 27/0093; G02B 27/0172; G02B 2027/0154; G02B 7/287; G06T 2207/30201
See application file for complete search history.

(56) References Cited

U.S. PATENT DOCUMENTS

| | | |
|---|---|---|
| 5,481,622 A | 1/1996 | Gerhardt et al. |
| 5,583,795 A | 12/1996 | Smyth |
| 6,359,602 B1 * | 3/2002 | Amafuji et al. ............ 345/8 |
| 6,421,064 B1 | 7/2002 | Lemelson et al. |
| 6,433,759 B1 | 8/2002 | Richardson et al. |
| 6,578,962 B1 | 6/2003 | Amir et al. |
| 6,637,883 B1 | 10/2003 | Tengshe et al. |
| 7,130,447 B2 | 10/2006 | Aughey et al. |
| 7,306,337 B2 | 12/2007 | Ji et al. |
| 7,340,399 B2 | 3/2008 | Friedrich et al. |
| 7,457,472 B2 | 11/2008 | Pace |
| 7,572,008 B2 | 8/2009 | Elvesjo et al. |
| 7,736,000 B2 | 6/2010 | Enriquez et al. |
| 8,139,025 B1 | 3/2012 | Krenz |
| 8,160,311 B1 | 4/2012 | Schaefer |
| 2002/0075384 A1 | 6/2002 | Harman |

(Continued)

OTHER PUBLICATIONS

U.S. Appl. No. 14/023,942 U.S. Office Action, mailed May 14, 2014.

(Continued)

*Primary Examiner* — Lun-Yi Lao
*Assistant Examiner* — Elliot Deaderick
(74) *Attorney, Agent, or Firm* — Mark E. Scott; Barry S. Newberger; Conley Rose, P.C.

(57) ABSTRACT

Correlating pupil position to gaze location within a scene. Illustrative embodiments may include correlating pupil position of a user to gaze location within a scene viewed by the user. The correlating may include: illuminating an eye of the user, the eye containing the pupil, and the illuminating with light; creating a first video stream depicting the eye; creating a second video stream depicting the scene in front of the user; determining pupil position within the first video stream; calculating gaze location in the second video stream based on pupil position in the first video stream; and sending an indication of the gaze location in the second video stream to a computer system.

12 Claims, 12 Drawing Sheets

(56) References Cited

U.S. PATENT DOCUMENTS

| | | |
|---|---|---|
| 2003/0098954 A1 | 5/2003 | Amir |
| 2004/0196433 A1 | 10/2004 | Durnell |
| 2005/0015120 A1* | 1/2005 | Seibel et al. .................... 607/54 |
| 2005/0206583 A1 | 9/2005 | Lemelson |
| 2006/0110008 A1 | 5/2006 | Vertegaal et al. |
| 2006/0147094 A1 | 7/2006 | Yoo |
| 2006/0209013 A1 | 9/2006 | Fengels |
| 2007/0159523 A1 | 7/2007 | Hillis et al. |
| 2007/0164990 A1 | 7/2007 | Bjorklund et al. |
| 2008/0008399 A1 | 1/2008 | Marugame et al. |
| 2008/0074389 A1 | 3/2008 | Beale |
| 2009/0196460 A1 | 8/2009 | Jakobs et al. |
| 2009/0219386 A1 | 9/2009 | Ebisawa |
| 2010/0007665 A1 | 1/2010 | Smith et al. |
| 2010/0008424 A1 | 1/2010 | Pace |
| 2010/0027890 A1 | 2/2010 | Yoshinaga et al. |
| 2010/0053210 A1* | 3/2010 | Kon ............................. 345/620 |
| 2010/0092049 A1 | 4/2010 | Schroeder et al. |
| 2010/0103375 A1 | 4/2010 | Chao |
| 2010/0109975 A1* | 5/2010 | Larson ............................. 345/8 |
| 2010/0128118 A1 | 5/2010 | Swindells et al. |
| 2010/0208207 A1 | 8/2010 | Connell, II |
| 2010/0241992 A1 | 9/2010 | Zhang |
| 2010/0328444 A1 | 12/2010 | Blixt et al. |
| 2011/0037941 A1 | 2/2011 | Reichow et al. |
| 2011/0051076 A1* | 3/2011 | Sugihara et al. .............. 351/158 |
| 2011/0085139 A1 | 4/2011 | Blixt et al. |
| 2011/0279666 A1 | 11/2011 | Strombom et al. |
| 2012/0038629 A1 | 2/2012 | Brown et al. |
| 2012/0062584 A1 | 3/2012 | Furukawa et al. |
| 2012/0113209 A1 | 5/2012 | Ritchey et al. |
| 2012/0236025 A1* | 9/2012 | Jacobsen et al. .............. 345/629 |
| 2012/0272179 A1 | 10/2012 | Stafford |
| 2013/0169530 A1 | 7/2013 | Bhaskar et al. |
| 2013/0188834 A1 | 7/2013 | Ebisawa |

OTHER PUBLICATIONS

U.S. Appl. No. 14/023,942, Final Office Action, Mailed Aug. 25, 2014.

Bradbury, Jeremy, et al., "Hands on Cooking: Towards an Attentive Kitchen." Extended abstract in proceedings of Conference on Human Factors in Computing Systems, pp. 996-997. Ft. Lauderdale, Florida. Apr. 2003.

"Blob Detection." Wikipedia.org. Web. Nov. 15, 2011 Retrieved Dec. 5, 2011.

"ITU Gaze Tracker." ITU Gaze Group. n. d. Web. Retrieved Dec. 1, 2011.

Li, Dongheng, et al., "Starburst: A Robust Algorithm for Video-Based Eye Tracking." Human Computer Interaction Program. Ames, Iowa; Sep. 5, 2005.

PCT Search Report and Written Opinion, PCT Appl No. PCT/US2013/060059, mailed Dec. 10, 2013.

* cited by examiner

CORRELATING PUPIL POSITION TO GAZE LOCATION WITHIN A SCENE

CROSS-REFERENCE TO RELATED APPLICATIONS

This application is a conversion of U.S. Provisional Application Ser. No. 61/705,724 filed Sep. 26, 2012 titled "System and method of headset assisted cursor control", which provisional application is incorporated by reference herein as if reproduced in full below.

BACKGROUND

Eye and/or gaze position tracking systems have many beneficial uses. For example, gaze position tracking systems may help disabled persons with cursor position control when using computer systems. Gaze position tracking may also find use in computer gaming, military applications, as well as assisting advertisers in gauging advertising placement effectiveness.

Many gaze position tracking systems require the user's head to be held steady. As a result the uses of gaze position tracking systems may not be efficient in real-world situations, and/or may not provide a sufficient range of tracking situations.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Real-time" with respect to cursor movement responsive to pupil position movement shall mean the cursor movement takes places within two seconds or less of movement of the pupil position movement.

"Light" shall mean electromagnetic radiation regardless of whether the light resides within visible spectrum or outside the visible spectrum (e.g., infrared).

"Central axis" shall mean an imaginary straight line extending along the center of an object (e.g., an elongate body) or the center of a real or theoretical surface (e.g., viewing direction, light beam), but shall not require the object or surface to define rotational symmetry about the central axis.

"About" shall mean within five percent (5%) of the recited value.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to aspects of an eye tracking headset system. Other example embodiments are directed to an eye tracking headset with related cursor control (including related software). Various embodiments may also be directed to a novel calibration method and system that relates pupil position to gaze location in a scene (including gaze location on a computer monitor within the scene). The specification first turns to a high level overview.

High Level Overview

Figure 1:
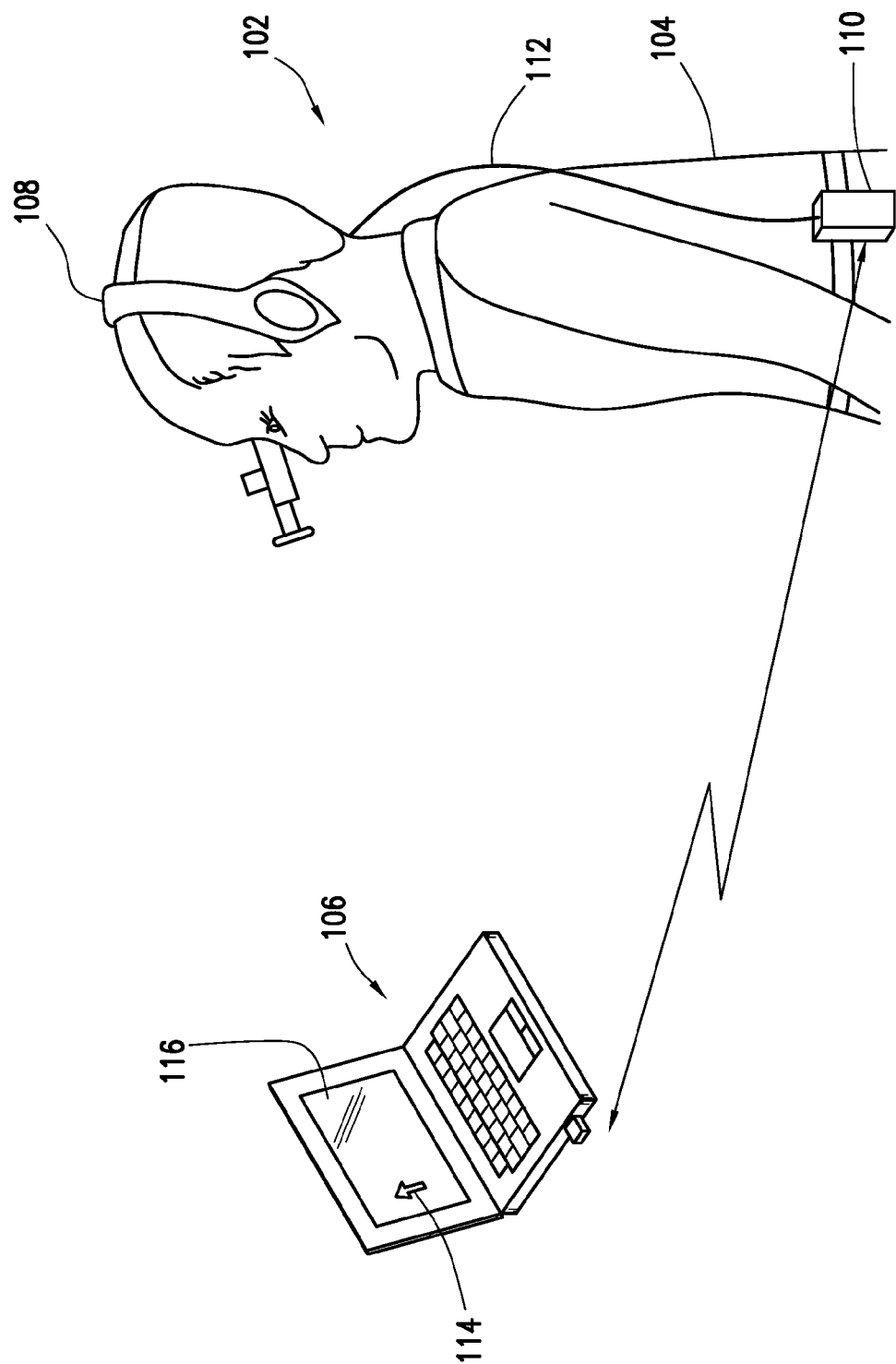
FIG. 1 shows a system in accordance with at least some embodiments.

FIG. 1 shows a system in accordance with at least some embodiments. In particular, the system of FIG. 1 comprises a headset system 102 illustratively coupled to the user 104, and a computer system 106 communicatively coupled to the headset system 102. The headset system 102 comprises a headset 108 configured to couple to the head of the user 104, along with belt pack 110 configured to couple to the belt or waistband of the user 104. The belt pack 110 houses electronic devices (discussed more below) which perform various functions, such as pupil identification, pupil position tracking, gaze location determination, and calibration procedures. The headset 108 is illustratively shown to couple to the belt pack 110 by way of cable 112, but wireless communication between the headset 108 and belt pack 110 is also contemplated.

The example headset system 102 is communicatively coupled the computer system 106, and as shown the communicative coupling may be by way of a wireless communication protocol or system (e.g., IEEE 802.11 wireless network, a Bluetooth network). In other situations, however, the belt pack 110, and thus the headset system 102, may communicatively couple to the computer system 106 by way of a wired or optical connection.

The headset system 102 has a plurality of cameras (not specifically shown in FIG. 1, but discussed more below) that facilitate pupil position tracking and gaze location determination. Using an eye camera that creates a video stream of the user's eye, the headset system 102 (and particularly programs executing on a processor in the belt pack 110) determine a series of pupil center positions. The headset system 102 then applies a homography that relates pupil center position in the video stream of the user's eye to the gaze location in a video stream produced by a forward looking scene camera. The headset system 102 then sends the gaze location information (along with other information) to the computer system 106.

In the example case of cursor control, the computer system 106 moves or places the cursor 114 at location on the display device 116 indicated by the gaze location. That is, the headset system 102 enables the user 104 to visually control position of the cursor 114 on the display device 116. In the example case of using the headset system 102 to gauge advertising placement, the headset system 102 sends the gaze location information to the computer system 106 such that the computer system 106, or an operator of the computer system, may evaluate the objects within the scene that garnered the attention of the user, and for how long. The specification now turns to a more detailed description of the headset 108.

Headset

Figure 2:
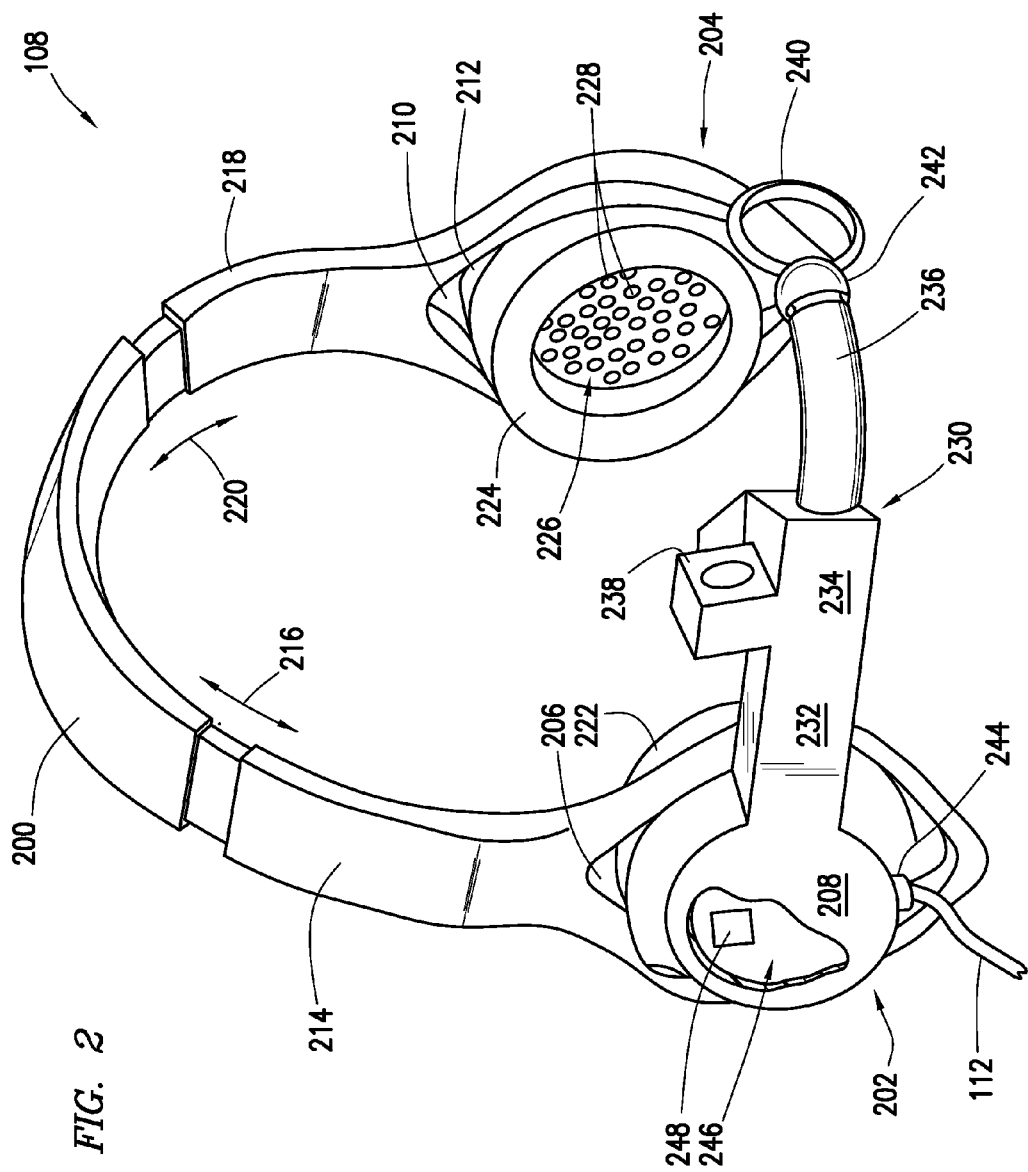
FIG. 2 shows a perspective view of a headset in accordance with at least some embodiments.

FIG. 2 shows a perspective, partial cut-away, view of a headset 108 in accordance with example embodiments. In particular, headset 108 comprises an adjustable head strap 200 defining a parabolic shape, as well as a first distal end 202 and a second distal end 204. Distal end 202 defines an aperture 206 within which a first ear piece member 208 (hereafter just ear piece 208) is disposed. In FIG. 2, the aperture 206 defines a "tear-drop" shape, though the aperture 206 may be any shape and size which enables coupling of the ear piece 208. For example, the aperture 206 may be circular, oval, or square. Similarly, the second distal end 204 defines an aperture 210 within which a second ear piece member 212 (hereafter just ear piece 212) is placed. Like aperture 206, the aperture 210 in the example system defines a "tear-drop" shape, though the aperture may be any suitable shape and size.

Thus, the example headset 108 comprises two ear pieces 208 and 212; however, in other cases the headset 108 may comprise only one ear piece (such as ear piece 208). In cases where only one ear piece is used, the distal end of the head strap 200 which does not couple to an ear piece may be configured to rest against the side of the head of user 104 to aid in holding the headset 108 in place.

In some example systems, the length of the head strap 200, as measured between the ear pieces 208 and 212 along the head strap 200, may be adjustable. In particular, in the example system outer portions of the head strap 200 may telescope into the center portion of the head strap 200. For example, outer portion 214 may telescope into and out of the center portion of the head strap 200, as shown by double-headed arrow 216. Likewise, outer portion 218 may telescope into and out of the center portion of the head strap 200, as shown by double-headed arrow 220. The adjustable length of the head strap 200 thus enables the user 104 to adjust the headset 108 so that the ear pieces 208 and 212 fit over the user's ears and the head strap 200 abuts the top of the user's head. Adjustment of the head strap 200 enables a single headset 100 to be usable for a plurality of user of different ages and/or head sizes.

Each of the ear pieces 208 and 212 may be of a circular shape. In the example systems, each ear piece is approximately three inches in diameter and one inch thick; however, the ear pieces may be any diameter, thickness, and/or design that enables operation of the methods as described herein. Each ear piece may comprise a padded portion on the inside surface (closest to the user's head) for wearing comfort and to reduce ambient noise. Thus, ear piece 208 has a padded portion 222 (only partially visible), and ear piece 212 has padded portion 224. Referring to padded portion 224 as representative of both padded portions, the padded portion 224 defines an internal aperture 226, within which the user's ear resides during use.

In the example system, each ear piece 208 and 212 comprises a speaker such that audible sounds may be conveyed to the ears of the user (e.g., sounds generated by programs executing on computer system 106). The speakers are not specifically shown in FIG. 2, but the speaker associated with ear piece 212 resides directly behind apertures 228. A similar arrangement regarding a speaker may exist for ear piece 208.

Still referring to FIG. 2, the headset 108 may further comprise an arm member 230 (hereafter just arm 230). The arm 230 is coupled to the head strap 200, and in example situations (and as shown) the arm couples to the head strap 200 by way of ear piece 208. While the example arm 230 couples to the "right" ear piece 208, the arm 230 may equivalently couple to the "left" ear piece 212 (with the arm 230 of appropriately mirrored construction). The arm 230 defines a proximal portion 232, a medial portion 234, and a distal portion 236. The proximal portion 232 couples to the example ear piece 208. Two cameras are disposed at the medial portion 234, an eye camera and a scene camera, though only the forward looking scene camera 238 is visible in FIG. 2. A reflective surface 240 is disposed at the distal end 236. In the example system the reflective surface 240 couples to the arm 230 by way of a ball and socket arrangement 242 such that the orientation of the reflective surface 240 with the respect to the eye of the user may be adjusted. As will be discussed more below, the eye camera is also "forward looking", and the eye camera captures video of the eye of the user as a reflection in the reflective surface 240. In the example system shown, the ball portion of the ball and socket arrangement 242 is rigidly coupled to the arm 230, while the socket portion of the ball and socket arrangement 242 is rigidly coupled to the reflective surface 240, but the locations may be equivalently reversed.

FIG. 2 shows cable 112 extending from the ear piece 208 to the belt pack 110 (the belt pack 110 not shown in FIG. 2). In some example systems, the cable 112 is a HDMI cable, and thus the cable 112 may have a HDMI connector 244 that mates with a corresponding connector defined in the ear piece 208. In other cases, the cable 112 may be hardwired to the ear piece 208, and thus no connector need necessarily be present.

Finally with respect to FIG. 2, in some cases various electronic devices may be housed within an interior volume of one or both the of the ear pieces 208 and/or 212. Ear piece 208 is shown in partial cut-away view to show that ear piece 208 defines an internal volume 246 within which various devices may be placed. In the example system, the interior volume 246 may house head movement measurement devices, such as a six-axis gyroscope 248. As will be discussed more below, the six-axis gyroscope is not needed for the gaze location determination in accordance with some example systems, but the six-axis gyroscope may enable useful features in some situations, such as computer gaming. In yet still other embodiments, the various devices within the belt pack 110 may be combined and/or miniaturized such that the various electronics can be housed in one of the ear pieces (or split between the ear pieces), thus eliminating the need for the belt pack in yet still other example systems.

Figure 3:
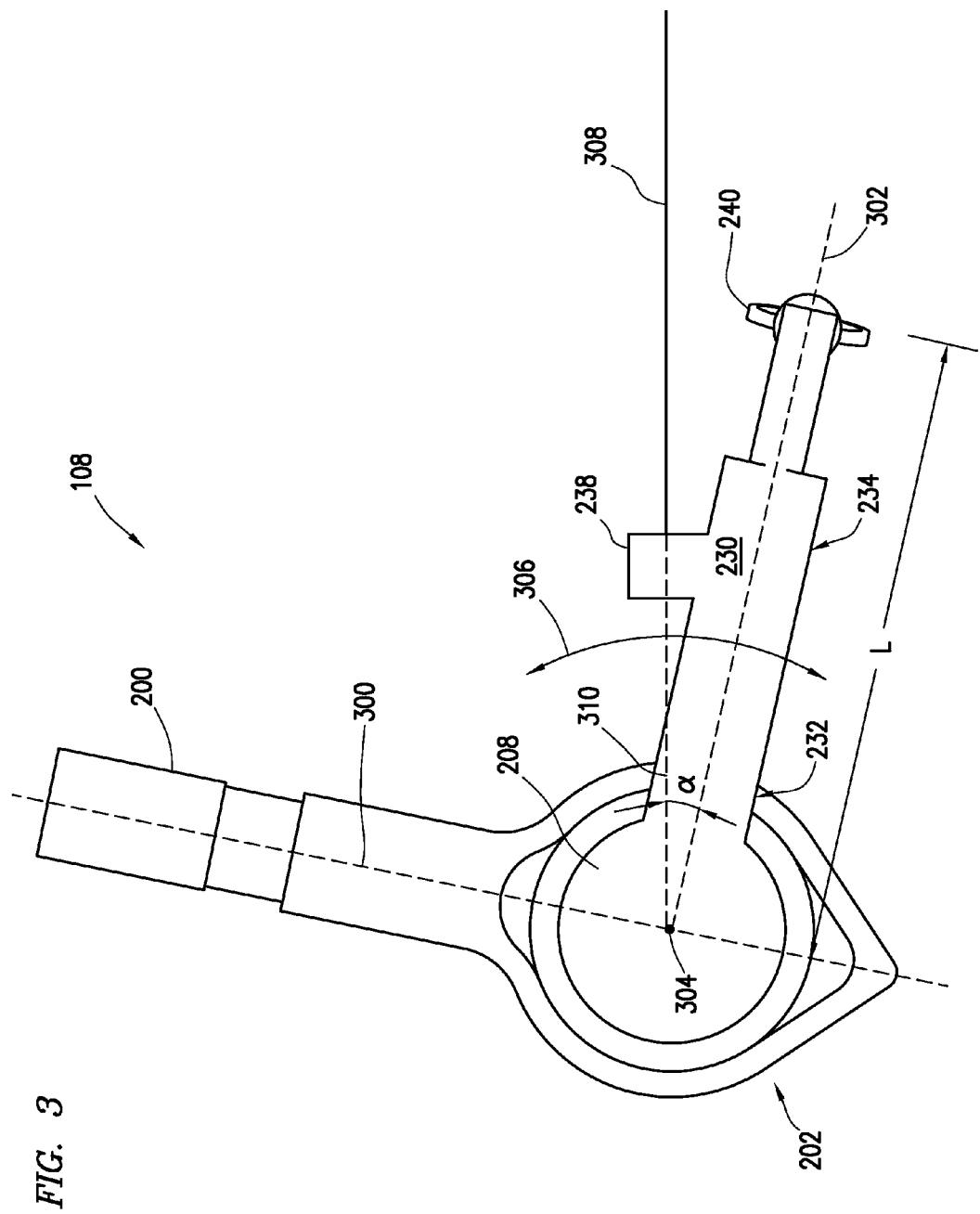
FIG. 3 shows a side elevation view of a headset in accordance with at least some embodiments.

Turning now to FIG. 3, FIG. 3 shows a side elevation view of the headset 108 in order to discuss physical relationships of various components of the headset 108. In particular, though the parabolic shape of the head strap 200 is not visible in FIG. 3, any consistent portion of the parabolic shape of the head strap 200 may be considered to reside in and thus define a plane. In the view of FIG. 3, the plane defined by the head strap 200 is perpendicular to the page, and thus the plane in the view of FIG. 3 would appear as a line. Using a center of the head strap 200 as the consistent feature, the plane defined by the headset is shown as plane 300 (shown as a dashed line).

At least the proximal portion 232 and medial portion 234 of arm 230 define an elongate body with a central axis 302. The central axis 302 of the arm 230 intersects plane 300. Thus, the arm 230 extends away from the plane 300 defined by the head strap 200. The length L of the arm 230 from the center 304 of the ear piece 208 (or, alternatively, from the intersection of the central axis 302 with the plane 300) to the outermost extent may be about six inches, although the length may be as short as five inches or as long as eight inches in other cases.

Still referring to FIG. 3, in various embodiments the angle formed between the plane 300 and the central axis 302 of the arm is adjustable, as shown by arrow 306. In some cases, the angle between the plane 300 and the central axis 302 of the arm 230 is adjustable in only one degree of freedom. Thus, for embodiments where the arm 230 is adjustable with respect to the plane 300 in only one degree of freedom, the arm 230 may adjust within the plane of the page of FIG. 3. The range of motion may be approximately 120 degrees, and the arm 230 may be moved upwards or downward a number of degrees in order to arrange the reflective surface 116 with respect to the location of the user's eye. For example, starting initially with the arm 230 in a horizontal orientation (arbitrarily assigned the 0 degree position), in example embodiments the arm 230 may be moved upwards (i.e., toward the head strap 200) as much as 60 degrees or downward (i.e., away from the head strap 200) as much as 60 degrees.

In accordance with some operational philosophies, the arm 230 may be adjusted such that the user's eye (in the example systems the right eye) looks through the reflective surface 240 toward distant objects. However, in other cases the arm 230 may be adjusted such that the reflective surface is outside the center of the user's line of sight (e.g., below the user's line of sight) when looking forward. In either event, the eye camera (again, not visible in FIG. 3) is designed, placed, and constructed to capture video of the eye as a reflection on or from the reflective surface 240.

As shown in FIG. 3, the viewing direction of scene camera 238 is away from the plane 300, and the viewing direction can be thought of as defining a central line 308 (i.e., the optical center of the viewing direction of the scene camera 238). If the central line 308 of the scene camera 238 is conceptually extended behind the scene camera 238 (as shown by dashed portion 310), in example embodiments the angle α between the central line 308 and the central axis 302 of the arm may be between 0 degrees (e.g., user looks through the reflective surface) and 30 degrees, and more particularly about 10 degrees. In the example system of FIG. 3, dashed line 310 intersects the center 304 of the ear piece 208, but such is not strictly required. In at least some embodiments, the angle α between the central line 308 of the scene camera 238 and the central axis 302 of the arm is not adjustable; rather, the angle α between the central line 308 and the central axis 302 is constant for a particular headset 108 design.

Figure 4:
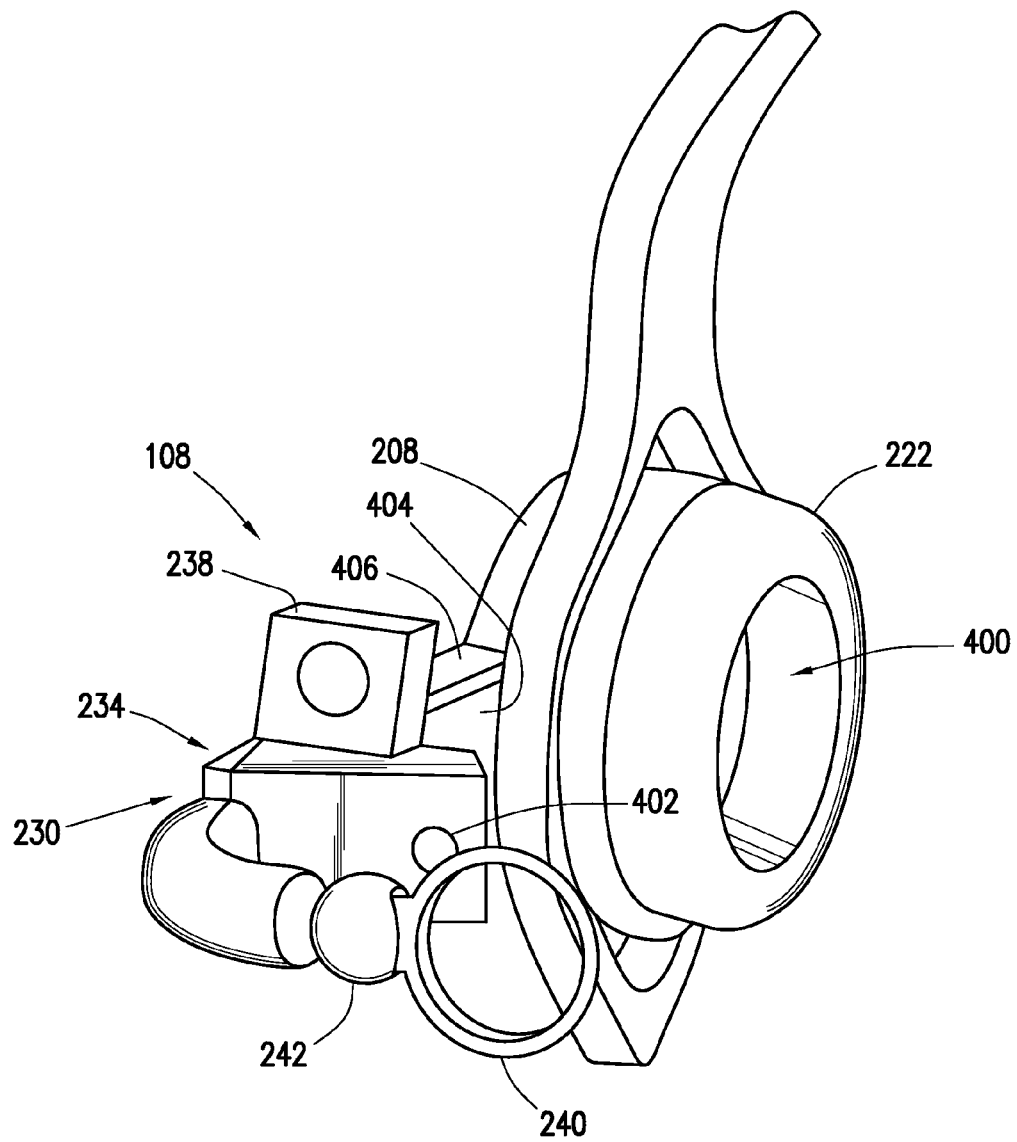
FIG. 4 shows a front perspective view of a headset in accordance with at least some embodiments.

FIG. 4 shows a partial perspective view of the headset 108 to describing various components not shown in the previous views. In particular, FIG. 4 shows that ear piece 208 likewise defines an aperture 400 in the padded portion 222. As with the aperture 226 associated with ear piece 212 (both shown in FIG. 2), the aperture 400 in the padded portion 222 is the location within which the user's ear will reside during use of the headset 108. A speaker (not specifically shown) in the ear piece 208 is provided such that audible sounds may be conveyed to the ear of the user (e.g., sounds generated by a program executing on an attached computer system).

Also visible in FIG. 4 is the eye camera 402. The example eye camera 402 is disposed on the medial portion 234 of the arm 230, and more particularly the eye camera 402 is disposed on the inside surface 404 of the arm (i.e., on the portion closest to the use's face when the headset is being worn). The scene camera 238, by contrast, is medially disposed but on an upper surface 406 of the arm 230. The eye camera 402 has viewing direction toward and that includes the reflective surface 240. As mentioned above, the eye camera 402 creates a video stream depicting the eye of the user as captured in a reflection on or from the reflective surface 240.

In situations where the user's line of sight looks through the reflective surface 240, the reflective surface may be transparent plastic or transparent glass. In situations where the reflective surface 240 is outside the center of the user's line of sight (e.g., below) when looking forward, the reflective surface 240 may be transparent plastic, transparent glass, or a glass mirror, and thus in some cases the reflective surface 240 may be referred to as a "hot mirror". In one embodiment, and as shown, the reflective surface 240 is circular in shape and may have a diameter ranging from about 0.5 inches up to about 1.25 inches. In some cases, the reflective surface 240 may be at least 95% translucent, particularly embodiments where the user looks through the reflective surface.

Based on operation of the ball and socket arrangement 242, the reflective surface 240 may be adjusted in order to position the reflective surface 240 in such a way that the eye camera 402 captures reflections of the user's eye from the reflective surface 240.

Figure 5:
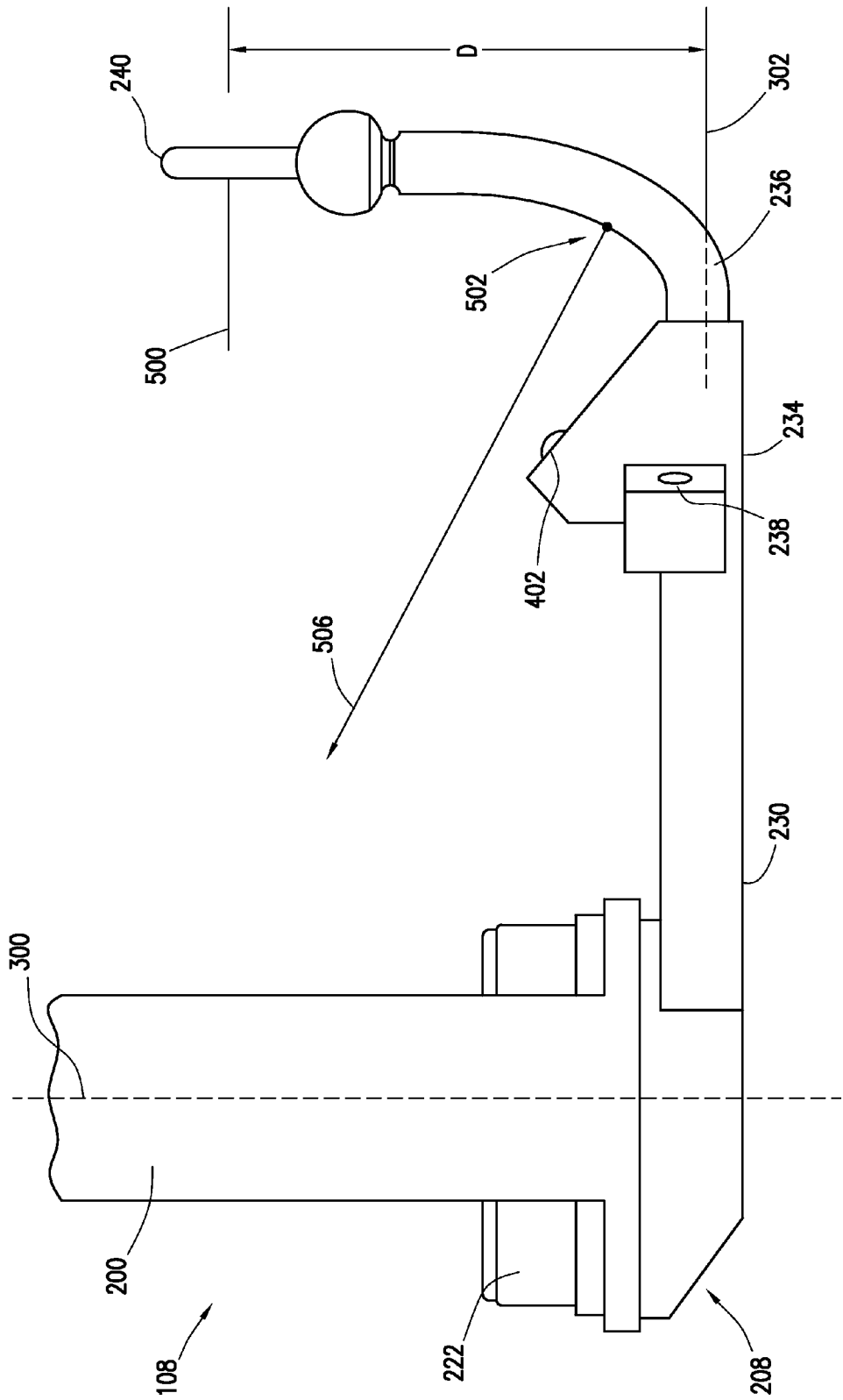
FIG. 5 shows an overhead aerial view of a headset in accordance with at least some embodiments.

FIG. 5 shows an overhead view of a portion of the headset 108 in order to describe further structural relationships of the various components of the headset 108. In particular, visible in FIG. 5 is a portion of the head strap 200 and ear piece 208, including the padded portion 222. The arm 230 is visible, along with the scene camera 238, the eye camera 402, and the reflective surface 240. The reflective surface 240 may reside in and thus define a plane (and in the view of FIG. 5 the plane is perpendicular to the page). Moreover, the reflective surface 240 defines a central axis 500 perpendicular to the plane (i.e., the central axis perpendicular to the plane defined by the reflective surface 240). In accordance with example embodiments, the distance D between the central axis 302 of the arm and the central axis 500 of the reflective surface 240 is about 1.5 inches. In other embodiments, the distance D may range from about one (1) inch to about (3) inches. That is, in the design of a headset 108 the distance D may be designed to fall within the range. In the embodiments shown in FIG. 5 the reflective surface 240 is not adjustable in the ranges provided, but in other cases the distance D may be adjustable.

FIG. 5 also shows that in some embodiments the headset 108 may comprise a light system 502. That is, in order to help capture a video stream of the user's eye the eye may be illuminated by at least one light source, such as a light emitting diode (LED) 504. In some cases, the light system 502 may comprise two or more LEDs, but in the view of FIG. 5 only one LED 504 is visible. As shown, the light system 502 is disposed on the distal portion 236 of the arm 230, and more particularly between the central axis 302 of the arm 230 and the central axis 500 of the reflective surface 240. Each LED of the light system 502 has a beam direction that shines toward the users eye (and thus toward the head strap 200, or toward the plane 300 defined by the head strap 200). The beam pattern created by each LED has a central axis, such as central axis 506 of the beam pattern for LED 504 (the beam pattern itself is not specifically delineated in FIG. 5).

In example embodiments, the light system 502 produces infrared light. In some cases, the infrared light created may have a center frequency of about 850 nanometers, but other wavelengths of infrared light may also be used. In other cases, the light system may create visible light, but infrared light is less distracting to the user. In some cases, the light system 502 may create between about 50 and about 250 milliwatts of luminous power, with each LED carrying a respective portion of the overall luminous power output.

Figure 6:
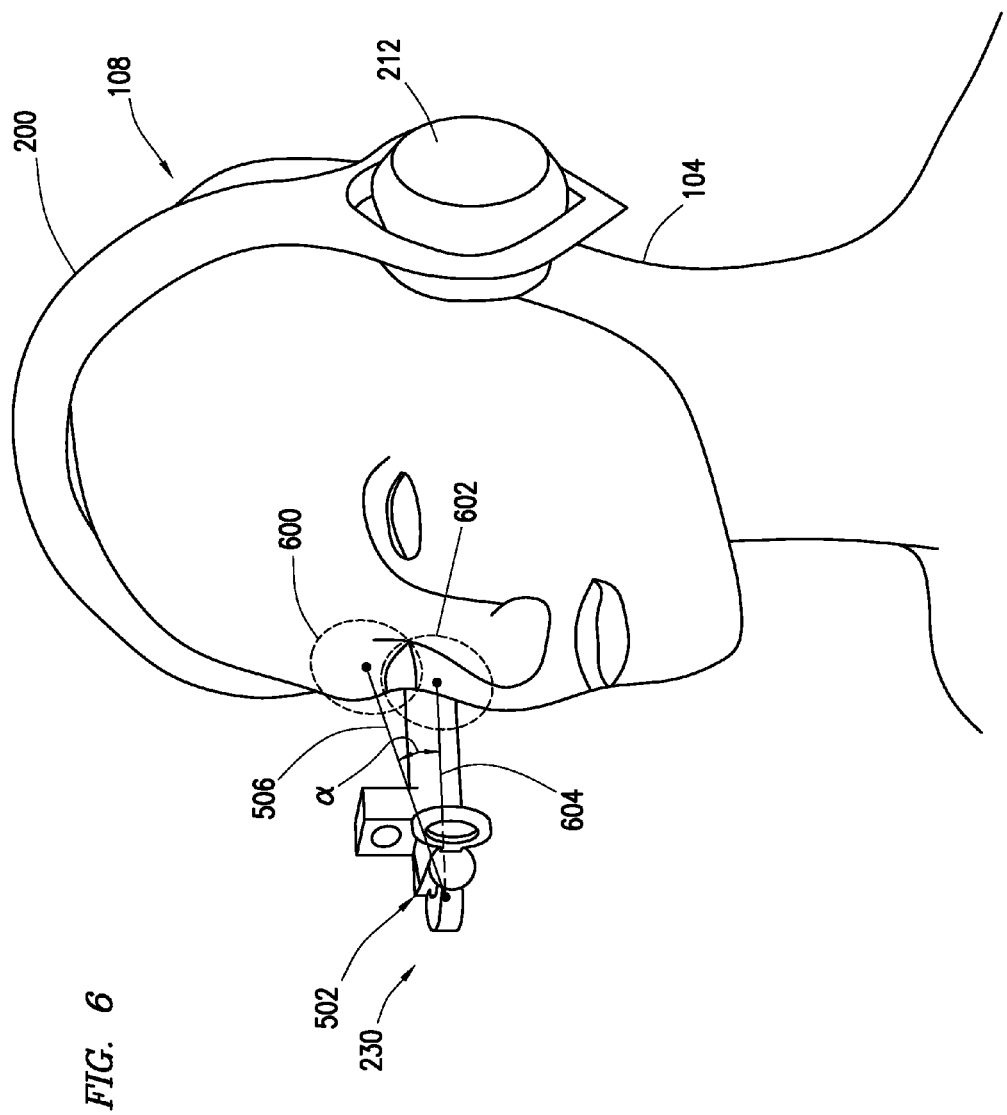
FIG. 6 shows a perspective view of a headset on a user in accordance with at least some embodiments.

FIG. 6 shows a perspective view of the headset 108 as worn by user 104. In particular, visible in FIG. 6 is the head strap 200, ear piece 212, as well as the arm 230 and components associated therewith. Although the LEDs are not visible in the view of FIG. 6, FIG. 6 does illustrate the beam patterns associated with an example two LEDs. In particular, one LED of the light system 502 creates a first beam pattern 600 on the user's face, and likewise another LED of the light system 502 creates a second beam pattern 602 on the user's face. In most cases, the upper or first beam pattern 600 is created by an LED of the light system 502 that is at a higher elevation, and the lower or second beam pattern 602 is created by a LED of the light system 502 at a lower elevation, but the relationship of elevation of a beam pattern and elevation of a respective LED is not constrained to be so related.

Each beam pattern defines a central axis. Thus, one beam pattern defines central axis 506, while the example second beam pattern defines a central axis 604. In accordance with example embodiments, the angle λ between the central axes of the two example beam patterns may be about 45 degrees. In some cases, LEDs are selected and mounted in the arm 230 such that the beam patterns define sufficient spot size that the two beam patterns overlap on the user's face. Moreover, the headset 108 is preferably designed and constructed, and/or adjusted if needed, such that the overlapping areas of the beam patterns correspond to the location of the user's eye, as shown in FIG. 6. However, so long as the eye resides within one or both the example beam patterns 600 and 602, there should be sufficient illumination for the eye camera to capture video of the eye (and the pupil) in the reflection on or from the reflective surface.

Headset Electronic Devices and Connections

Figure 7:
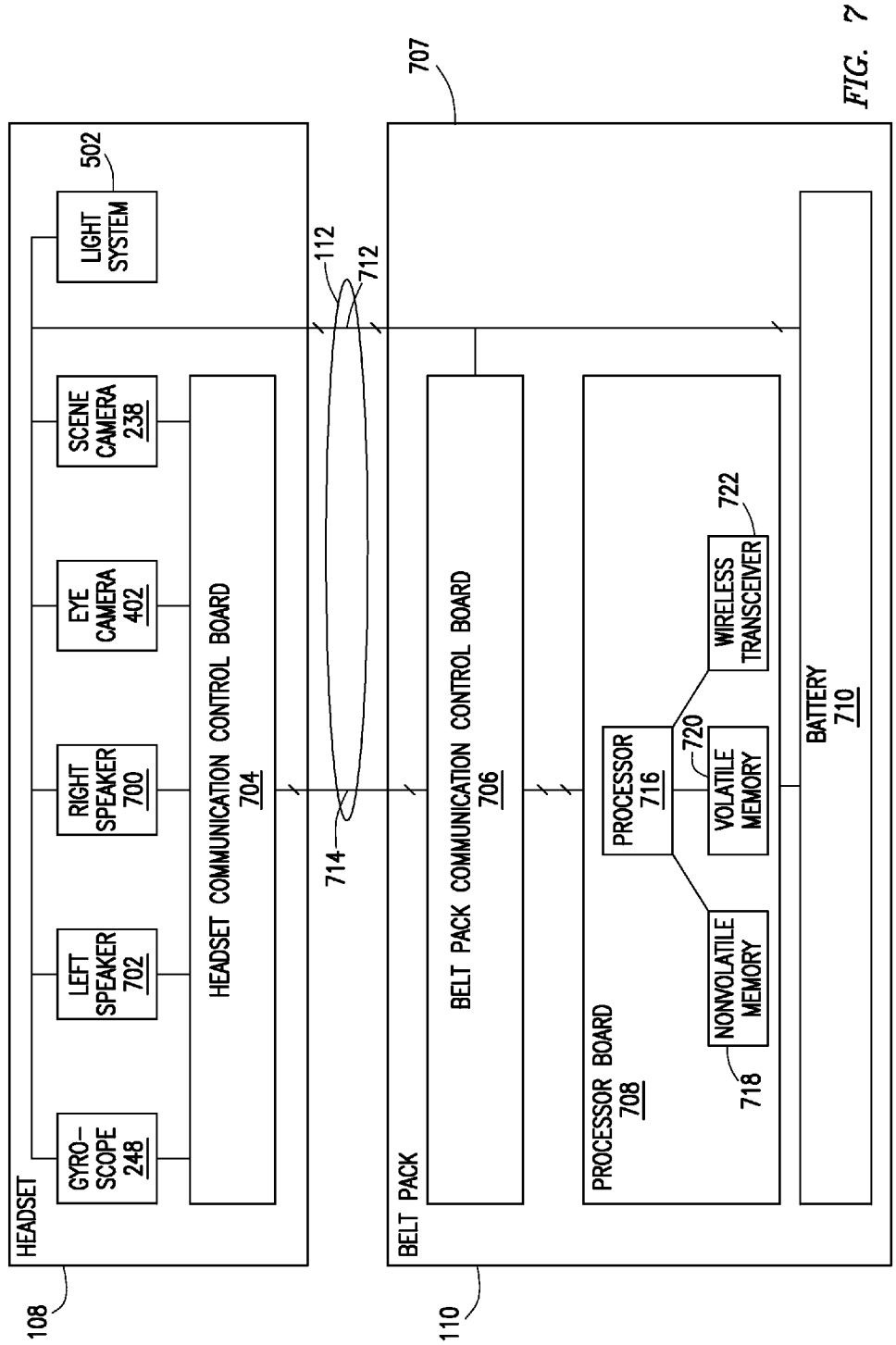
FIG. 7 shows, in block diagram form, electronics of a headset system in accordance with at least some embodiments.

FIG. 7 shows an electrical block diagram of various components of the headset system 102. In particular, FIG. 7 shows the headset 108 and belt pack 110 coupled by way of cable 112. Within the headset 108 resides a host of electrical and/or electronic components, some of which have been previously introduced. Headset 108 comprises the light system 502, scene camera 238, eye camera 402, right speaker 700, left speaker 702, and gyroscope 248. Data flows from headset 108 to the belt pack 110, and in the example embodiments the data are routed through and handled by the headset communication control board 704 (hereafter just control board 704). Communication from the belt pack 110 to the headset is also contemplated (e.g., camera control commands, audio for the speakers), and thus the control board 704 likewise handles receiving any such commands and data from the belt pack 110.

Right speaker 700 and left speaker 702 may be any suitable set of speakers for delivering audio to the user, such as circular speakers with eight or four ohm characteristic impedance.

Scene camera 238 in the example embodiments is a digital camera that produces a video stream at a frame rate of about 30 frames per second. As discussed above, the scene camera is arranged on the headset 108 to produce a video stream of the scene in front of the user. In some example systems, the scene camera 238 has 720 lines of vertical resolution and is progressive scan (i.e., is a 720 p camera), but other resolutions and frame rates may be equivalently used. The scene camera in various embodiments is designed to capture and record light from the visible spectrum, and thus either the camera array is designed to be responsive only to the light in the visible spectrum, or the camera array has optical filters that only allow from the visible spectrum to reach the camera array. In accordance with the example embodiments, the scene camera sends the video stream to the belt pack 110 in the form of a stream of JPEG encoded files, one JPEG image per frame.

Eye camera 402 in the example embodiments is a digital camera that produces a video stream at a frame rate of about 60 frames per second. As discussed above, the eye camera 402 is arranged on the headset 108 to produce a video stream of the eye of the user, and as illustrated the right eye of the user. Further in the embodiments shown, the eye camera 402 is arranged to capture the images to produce the video stream as the reflection of the eye in the hot mirror or reflective surface 240. In other embodiments, the eye camera 402 may be arranged to capture the images to produce the video stream directly (i.e., a direct capture, not as a reflection).

In the example system the eye camera 402 has a resolution of 640×480 pixels. Inasmuch as the light system 502 shines infrared light on the user's eye, the eye camera 402 in such embodiments is designed to capture infrared light, and thus either the camera array is designed to be responsive only to infrared light, or the camera array has optical filters that only allow infrared light to reach the camera array. In accordance with the example embodiments, the eye camera sends the video stream to the belt pack 110 in a raw image format in the form of RGB encoded information, sometimes referred to as Bayer RGB. In cases where the light system 502 illuminates the eye with visible light, or perhaps the headset system 102 is operated in an environment where sufficient visible ambient light exists, the eye camera 402 may instead capture and record visible light.

Light system 502 has been previously discussed to contain one or more LEDs, and in some cases two LEDs, that illuminate the eye with infrared light. In other cases, different type light sources may be used (e.g., incandescent bulbs), and light other than infrared may also be used (e.g., visible light).

Optional gyroscope 248 resides within the headset (e.g., in the ear piece 208 as shown in the FIG. 2) and communicatively couples to the belt pack 110 by way of the control board 704. Gyroscope 248 may be present to determine head movement of the user 104, but again it is noted that head movement measurements are not required to relate pupil center position the video stream of the eye camera to gaze location in the video stream of the scene camera in at least some embodiments. In an example system, the headset 108 comprises a six-axis gyroscope (e.g., a combination accelerometer and gyroscope). In this way, head orientation and movement, including yaw, pitch and roll, may be ascertained. In other cases, head movement may be determined, with less accuracy, with a three-axis accelerometer. Likewise, while possible to determine head movement in a broad sense with a gyroscope alone, using a six-axis gyroscope, very precise head movement changes can be detected and quantified.

Turning now to the belt pack 110, belt pack 110 may comprise an electronics enclosure 707 defining an interior volume within which the various components are housed. Within the enclosure 7070 may reside the belt pack communication control board 706 (hereafter just control board 706), processor board 708, and battery 710. Battery 710 provides operational power for all the components of the headset system, including the components of the belt pack 110. By way of one or more conductors 712 in the cable 112, the electrical components of the headset 108 are provided power from the battery 710 as well. The battery 710 may take any suitable form, such as one or more single use batteries, or a rechargeable battery or set of batteries (e.g., lithium-ion batteries).

Control board 706 is a companion board to the control board 704 in the headset 108, and the control boards 704 and 706 work together to exchange data and commands between the headset 108 and the belt pack 110. In particular, by way of conductors 714 within the cable 112, the control board 704 may send to control board 706: frames of the video stream captured by the scene camera 238; frames of the video stream captured by the eye camera 402; roll, pitch, and yaw measurements made by the gyroscope 248. Moreover, the control board 706 may send to the control board 704: control commands to the cameras 238 and 402; and audio for the right and left speakers 700 and 702. In example systems, the control boards may be communicatively coupled by way of a cable 112 being an HDMI cable, and thus the control boards 704 and 706 may be coupled by conductors 714 in the cable 112, with the number of conductors being up to 19 conductors.

Processor board 708 is communicatively coupled to the control board 706. The processor board 708 comprises a processor 716 coupled to nonvolatile memory 718, volatile memory 720, and a wireless transceiver 722. Nonvolatile memory 718 may comprise any suitable nonvolatile memory system capable of holding programs and data for an extended period of time, such as battery backed random access memory (RAM) or read only memory (ROM) (e.g., flash memory). Volatile memory 720 may be the working memory for the processor 716. In many cases, programs and data stored on the non-volatile memory 718 may be copied to the volatile memory 720 for execution and access by the processor 716. In some cases, the volatile memory 720 may be dynamic RAM (DRAM), or synchronous DRAM (SDRAM). One or both the nonvolatile memory or the volatile memory may be a computer-readable medium upon which computer program instructions and data may be stored. Other examples of computer-readable mediums include CDROM, DVDs, magnetic storage disks, and the like.

Still referring to FIG. 7, the example processor board 722 further comprises a wireless transceiver 722 coupled to the processor 716. The wireless transceiver 722 enables the processor board 708, and thus programs executing on the processor 716, to communicate wirelessly with other computer systems, such as computer system 106 (FIG. 1). In example systems, the wireless transceiver 722 implements a wireless communication protocol, such as one of the IEEE 802.11 family of wireless protocols. The wireless transceiver 722 may appear as a wireless router operating under the IEEE 802.11 protocol, and to which the computer system 106 may communicatively couple and exchange data with the programs executing on the processor 716. Other wireless communication protocols are also contemplated, such as a Bluetooth protocol connection system.

In the example system, the processor board 708 is an i.MX 6 series development board (also known as a Nitrogen6X board) available from Boundary Devices of Chandler, Ariz. Thus, the example processor 716 may be a 1 Giga Hertz ARM® core processor integrated with the i.MX 6 series development board running a Linux operating system. Likewise, the i.MX 6 series development board may come with volatile memory 718, nonvolatile memory 720, and the wireless transceiver 722. However, other implementations of the processor board 708 are contemplated, such as integrating the components from various manufacturers, or creation of an application specific integrated circuit to implement the various features.

Software Operation

The specification now turns to operational aspects of the headset system 102. Since the functionality is implemented, at least in part, by way of software executing on the processor 716, description of the operational aspects are thus a description of the software operation. The discussion begins with a discussion of calibration of the system.

Calibration

A first example step in using headset system 102 is a calibration procedure. That is, a procedure is performed from which a homography is created, where the homography relates pupil center position to gaze location in the scene. In this example procedure, the head position of the user need not be known or measured, and thus the presence of gyroscope 248 is not strictly required.

Figure 8:
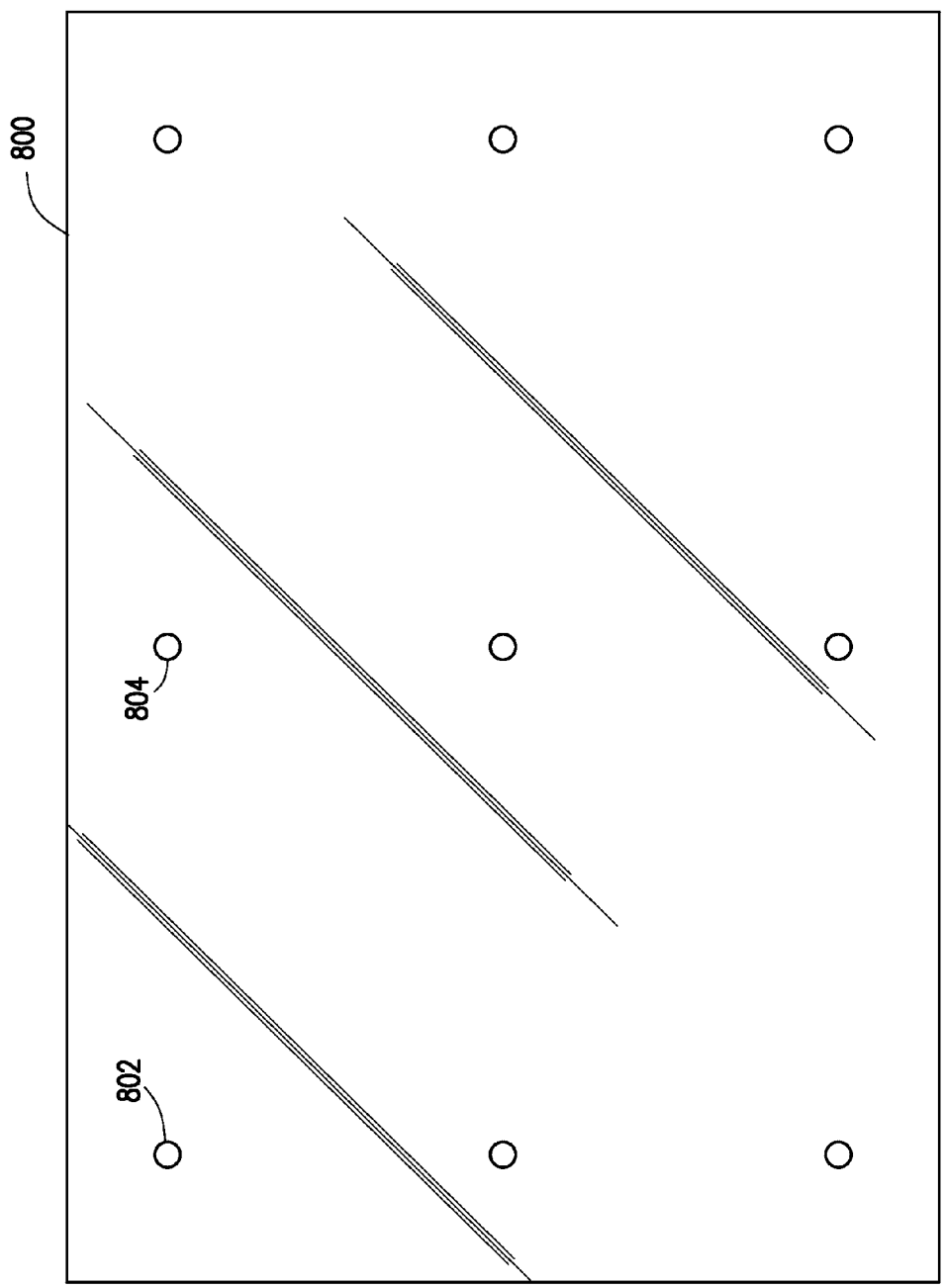
FIG. 8 shows example calibration features in accordance with at least some embodiments

FIG. 8 shows an example set 800 of calibration points or calibration features. During a calibration procedure, calibration features are sequentially displayed in the scene in front of the user, and the user is asked to look at each of the calibration features as they are displayed. For example, calibration feature 802 may be initially displayed, and the user looks at the calibration feature 802 as it exists in the scene. After a predetermined period of time (e.g., five seconds), in the example calibration method the calibration feature 802 is removed from the scene, calibration feature 804 is displayed, and the user looks at calibration feature 804. The cycle is repeated for each calibration feature, and in the example shown in FIG. 8 nine such calibration features are ultimately shown.

In some cases, the calibration features may be displayed on the display device 116 of the computer system 106. That is, programs executing in the belt pack 110 may communicate with the computer system 106 and cause the computer system 106 to show the calibration features. However, calibration using calibration features shown on a display device of a computer system is not strictly required, even when the ultimate goal is cursor control. That is, in some cases the calibration features are not shown on a display device of a computer system. The calibration features may be shown in the scene in front of the user in any suitable form, such as on the display device of a computer system different than the one on which cursor control is desired, or by displaying a poster board in front of the user and sequentially revealing the calibration features.

Moreover, while the example calibration implements nine calibration features, fewer calibration features (e.g., two calibration features at opposing corners of the scene, or four calibration features at the four corners of the scene) may be used. Likewise, greater than nine calibration features may be used. Further still, sequentially revealing the calibration features may not be required. That is, all the calibration features may be simultaneously displayed, and the user sequentially looks at each calibration features in a predetermined order (e.g., upper left to upper right, then middle left to middle right, etc.).

Figure 9:
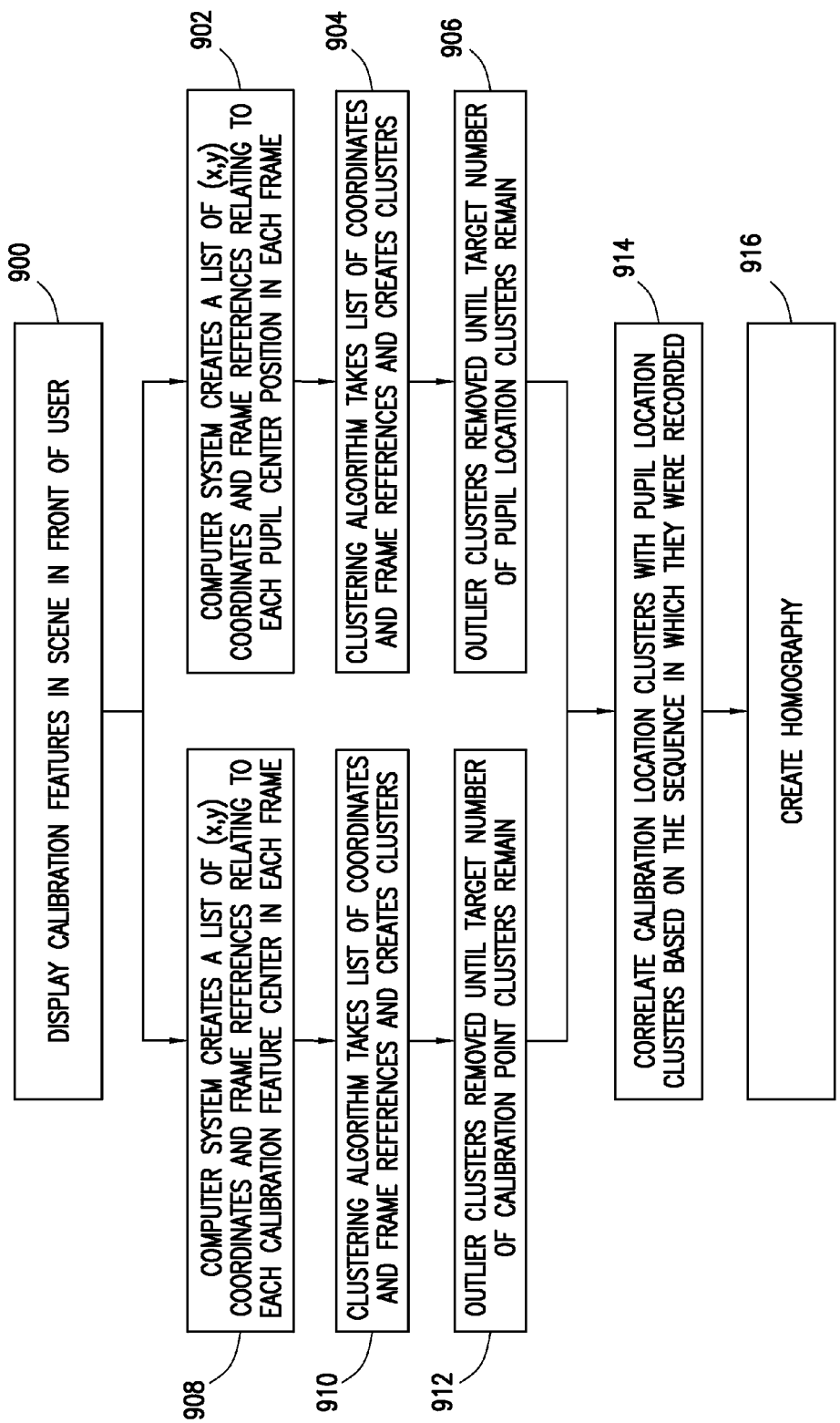
FIG. 9 shows a flow diagram of calibration steps in accordance with at least some embodiments.

FIG. 9 shows, in block diagram form, an example calibration method, some of which may be implemented by programs executing on a processor 716. The example method starts by displaying calibration features in the scene in front of the user (block 900). As shown, the example method has two parallel paths, one associated with the scene camera (the left branch), and one associated with the eye camera (the right branch). The discussion starts with the branch associated with the eye camera.

In particular, during the period of time that the calibration features are being displayed, the eye camera 402 creates a video stream comprising a plurality of frames. In some cases, the eye camera 402 produces about 60 frames per second, and each frame is provided to the software executing on the processor 716 within the belt pack 110. For each frame, the program executing on the processor determines the pupil position, and more particularly pupil center position, within the frame. Any suitable method to determine pupil center position may be used, such as those described in the co-pending and commonly assigned patent application Ser. No. 13/339,543 titled "System and method of moving a cursor based on changes in pupil position" (published as US Pub. No. 2013/0169532), which application is incorporated by reference herein as if reproduced in full below. Based on the pupil center position determination within each frame, the program creates a list of pupil center position coordinates (i.e., X,Y coordinates), and associated with each X,Y coordinate is a frame number (block 902). The frame number for each sequential frame is a sequentially assigned number by the eye camera 402. The frame number provides a time-like reference for each X,Y coordinate within the series of frame numbers, but may not provide an indication of actual local time. As will be discussed more below, the frame numbers may help logically relate the X,Y coordinates to the sequence of calibration features.

Once all the calibration features have been shown, and the processor 716 has created the list of pupil center position coordinates (and frames numbers) (again block 902), the next step in the illustrative method is applying the data from the list to a clustering algorithm to identify clusters (block 904). That is, the data from the list of X,Y coordinates is clustered by the processor 716 based on the X,Y coordinates (e.g., distance-based clustering) to identify groups or clusters within the data. Any suitable clustering algorithm may be used to perform the clustering. For example, the clustering algorithm may be the K-means++ algorithm, where the K-means++ algorithm may take as input the list of coordinates and a target number of clusters (e.g., nine).

Though in the example method nine calibration features are shown, in most cases more than nine clusters will be identified in the data by the clustering algorithm. The additional clusters may be present for any number of reasons, such as inattention or distraction of the user during the calibration procedure, errors in pupil center position determination, and/or inefficiencies in the clustering algorithm itself. Regardless, the next step in the illustrative method may be to remove outlier clusters (e.g., remove based on the number of points in the cluster, assuming clusters created from the user looking at features other than calibration features will have fewer members) until the target number of clusters remain (block 906). Again, for calibration procedures using nine calibration features, nine clusters would be expected.

Turning now to the left branch of the example method, the branch associated with the scene camera. In particular, during the period of time that the calibration features are being displayed, the scene camera 238 creates a video stream comprising a plurality of frames. In some cases, the scene camera 238 produces about 30 frames per second, and each frame is provided to the software executing on the processor 716 within the belt pack 110. For each frame, the program executing on the processor determines the center position of the calibration feature within the frame. Any suitable method to determine center position of the calibration features may be used. In the case of calibration features in the form round dark colored dots sequentially presented, the pupil center position determination algorithms may be used.

Based on the center position determination within each frame, the program creates a list of calibration feature center position coordinates (i.e., X,Y coordinates), and associated with each X,Y coordinate is a frame number (block 908). The frame number for each sequential frame is a sequentially assigned number by the scene camera 238. The frame number provides a time-like reference for each X,Y coordinate within the series of frame numbers, but may not provide an indication of actual local time. Moreover, there may be no numerical relationship between frame numbers as assigned by the scene camera 238 and frame numbers assigned by the eye camera 402 as discussed above. Again as will be discussed more below, the frame numbers may help logically relate the X,Y coordinates to the sequence of calibration features.

Once all the calibration features have been shown, and the processor 716 has created the list of center position coordinates (and frames numbers) (again block 908), the next step in the illustrative method is applying the data from the list to a clustering algorithm to identify clusters (block 910). That is, the data from the list of X,Y coordinates is clustered by the processor 716 based on the X,Y coordinates to identify groups or clusters within the data. Any suitable clustering algorithm may be used to perform the clustering, such as the K-means++ algorithm mentioned above.

Though again in the example method nine calibration features are shown, in most cases more than nine clusters will be identified in the data by the clustering algorithm. The additional clusters may be present for any number of reasons, such as the background on which the calibration features are shown not spanning the entire scene captured by the scene camera 238, errors in center position determinations, and/or inefficiencies in the clustering algorithm. Regardless, the next step in the illustrative method may be to remove outlier clusters until the target number of clusters remains (block 912). For calibration procedures using nine calibration features, nine clusters would be expected in the data created from the scene camera frames.

Still referring to FIG. 9, the next step in the illustrative method is to correlate the calibration location clusters (i.e., clusters created from the frames of the scene camera) with pupil center location clusters (i.e., clusters created from the frames of the eye camera) (block 914). In some example methods, the correlation of the clusters may be in a time-like manner. That is, the data created with respect to both the eye camera and the scene camera includes not only center position coordinates, but also frame numbers assigned by the respective cameras. While no absolute time information is necessarily included or embedded in the frame numbers, the frame numbers will imply a time order at least within the frames numbers themselves. That is, the frame numbers created and assigned by the eye camera imply an order of the frames, and likewise frame numbers created and assigned by the scene camera imply an order of the frames. Thus from the frame numbers an order of appearance of the calibration location clusters may be determined, and likewise an order of appearance of the pupil center location clusters may be determined. From the order of appearance, and the knowledge of the order of presentation of the calibration features, the relationship of the clusters within each data set may be determined.

From the relationship of the clusters, a homography is created which correlates pupil center position in the frames of the eye camera to gaze location in the frames of the scene camera (block 916). That is, data in the form of pupil position is applied to the homography, and the homography mathematically transforms the pupil center location to a pixel position in the frames of the scene camera—the gaze location of the user. Note that the example system can determine the gaze location of the user within the scene in front of the user regardless of where the user is looking. If the user is looking at a scene within the room (that does not include a computer monitor), the processor 716, determining pupil center positions and applying the homography, can determine where in the room the user is looking in real-time. Inasmuch as the example eye camera produces about 60 frames per second, and the example scene camera produces about 30 frames per second, each gaze location within frame of the scene camera may be based an average of two or more pupil center positions.

Gaze Direction Determination

A headset system 102 calibrated as described above may have many beneficial uses. For example, a user wearing a headset system 102 calibrated as above may be a test subject regarding placement of advertising. With the eye and scene cameras operational, and the processor 716 in the belt pack 110 determining gaze location within the scene in real-time, the user may be allowed to shop (e.g., in a grocery store). Viewing patterns and habits of the user 104 may be determined. For example, the processor 716 may make the gaze location determination, and send the gaze locations determined along with the video stream from scene camera (the sending by the wireless transceiver 722) to a researcher in proximity. The researcher may then glean information about viewing patterns, and how to improve product placement. Other example uses are possible.

Cursor Position Control

In many cases, however, the gaze location determination of the headset system 102 is used in the context of a computer display device. Not only might the gaze location determinations be useful from a research standpoint (e.g., determining hot zones for advertising placement on display devices of computer systems), but the gaze location determinations may also find use in cursor position control, particularly for the disabled.

In an absolute sense, the headset system 102 can determine gaze location within a scene whether or not there is a computer display device in the scene. However, in order to use the gaze location determinations for cursor control on the display device of the computer system, additional information may be needed. In accordance with example embodiments, in order to relate gaze location within a scene that includes a display device to gaze location on the display device, programs executing on the processor 716 in the belt pack 110 also identify the display device within the scene. The specification now turns to example methods of identifying the display device within the scene in reference to FIG. 10.

Figure 10:
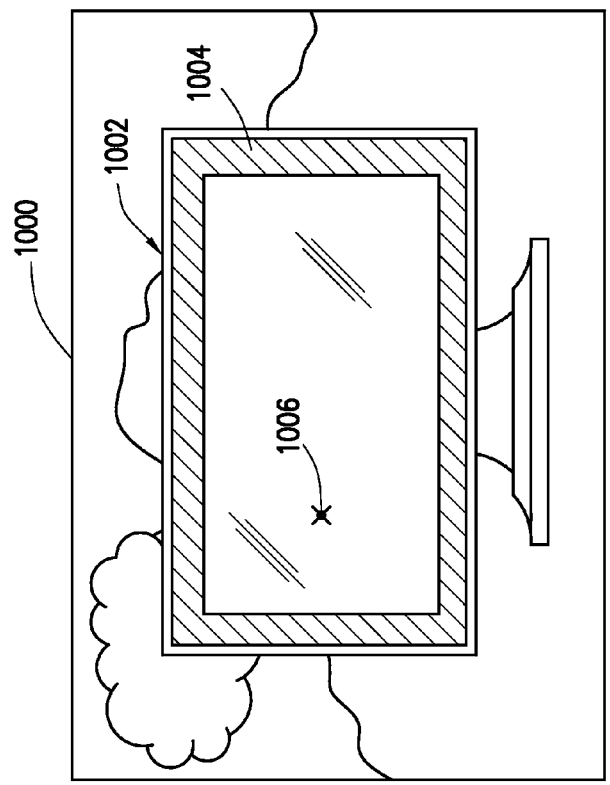
FIG. 10 shows an example monitor located within a scene in accordance with at least some embodiments.

FIG. 10 shows a frame 1000 of the video stream created by the scene camera. Within the frame 1000 resides a display device 1002. In accordance with example methods, the location/size of the display device 1002 may be identified within the scene by the processor 716. For example, the display device 1002 within the scene may show a border 1004 of predetermined color (e.g., blue). In one example embodiment, the border 1004 may be created within the active area of the display device. In another example embodiment, the border 1004 may be placed around the active area of the display device 1002 (e.g., blue tape placed on the case around the active area of the display device). The border 1004 (regardless of form) may be identified using machine vision software running on the processor 716 of the headset system 102. FIG. 10 illustratively shows a gaze location 1006 within the display device 1002.

Figure 11:
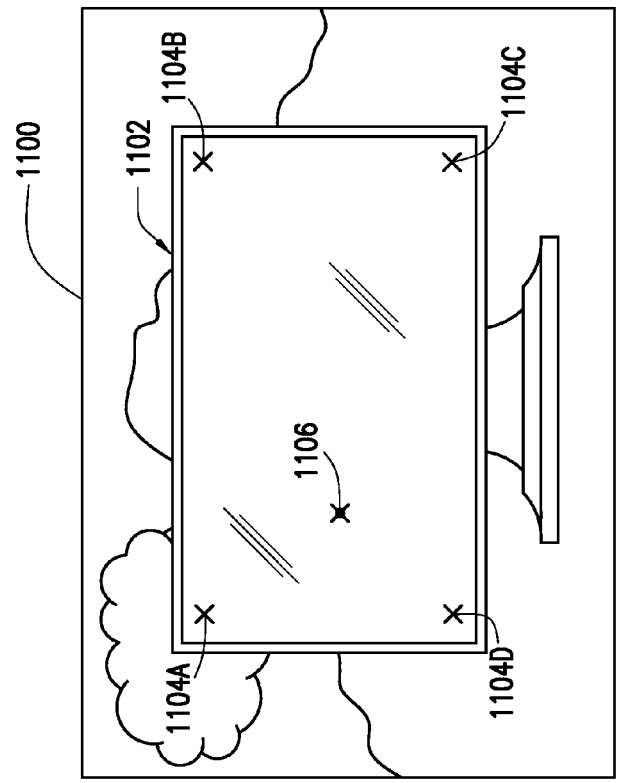
FIG. 11 shows an example monitor located within a scene in accordance with at least some embodiments.

FIG. 11 shows a frame 1100 of the video stream created by the scene camera to depict an alternate method of identifying the display device within the scene. In particular, within the frame 1100 resides a display device 1102. In accordance with example methods, the display device 1102 may show a plurality of indicia of corner locations (labeled 1104A, 1104B, 1104C, and 1104D). In the example of FIG. 11, the indicia of corner locations are shown as "+" symbols, but any identifiable symbol may be used, and in fact each indicia of a corner location may be a different symbol. In one example embodiment, the indicia of corner locations 1104 may be created within the active area of the display device. In another example embodiment, the indicia of corner locations 1104 may be placed around the active area of the display device 1102 (e.g., decals placed on the case around the active area). The indicia of corner locations (regardless of form) may be identified using machine vision software running on the processor 716 of the headset system 102. FIG. 11 illustratively shows a gaze location 1106 within the display device 1002.

Figure 12:
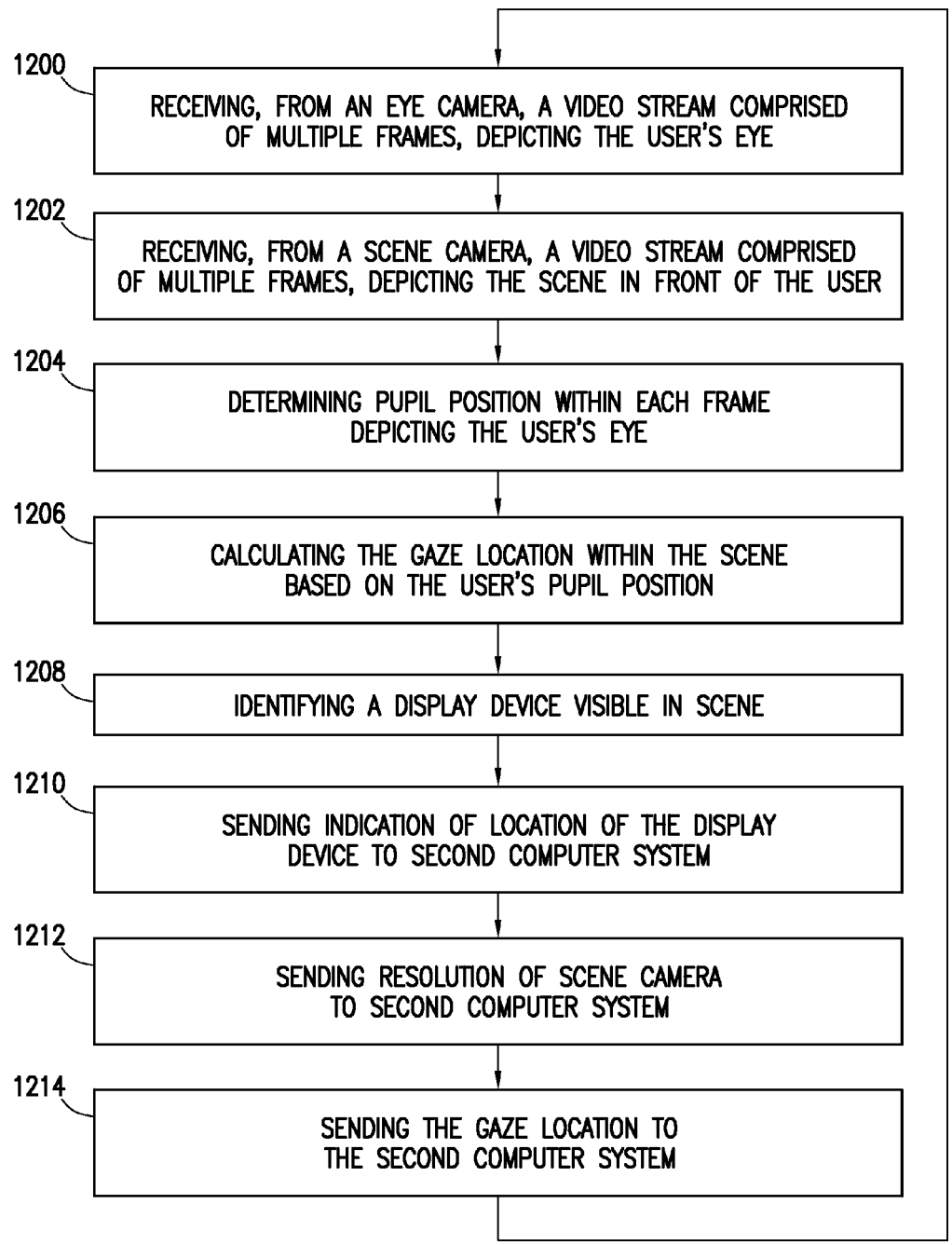
FIG. 12 shows a flow diagram of an example method of correlating pupil location to gaze location in accordance with at least some embodiments.

FIG. 12 shows a method in accordance with example embodiments implementing cursor control, where some of the example steps may be performed by software executing on the processor 716 of the headset system 102. In particular, the method starts by the processor receiving, from the eye camera, a video stream comprised of multiple frames, the video stream depicting the eye of the user (block 1200). Further, the processor receives, from the scene camera, a video stream comprised of multiple frames, the video stream depicting the scene in front of the user (block 1202). The processor determines pupil center position within each frame (block 1204), and calculates the gaze location within the scene based on the user's pupil center position (block 1206). That is, in block 1306 the processor 716 applies the homography determined in the calibration phase.

Next, the processor 716 identifies a display device visible in the scene (block 1208). Identifying the display device may take any suitable form, such as identifying the border 1004 of predetermined color (discussed with respect to FIG. 10), or identifying the indicia of corner locations (discussed with respect to FIG. 11). Once the location of the display device within the scene is has been determined, the processor 716 of the headset system 102 sends an indication of the location of the display device within the scene to a second computer system (i.e., the computer system on which the cursor is to be controlled) (block 1210). For example, the processor 716 may send four pixel locations representing the four corners of the display device within the scene. Next, the processor 716 sends an indication of the resolution of the scene camera to the second computer system (block 1212), and sends an indication of the gaze location within the scene to the second computer system (block 1214). In most cases sending of the information to the second computer system is in real-time with creation and/or receiving of the frames from the eye camera and/or the scene camera. In most cases, the example method then begins anew with receiving frames of the video stream of the eye camera (again block 1200). The balance of the cursor control may be implemented on the computer system on which the cursor is to be controlled.

Figure 13:
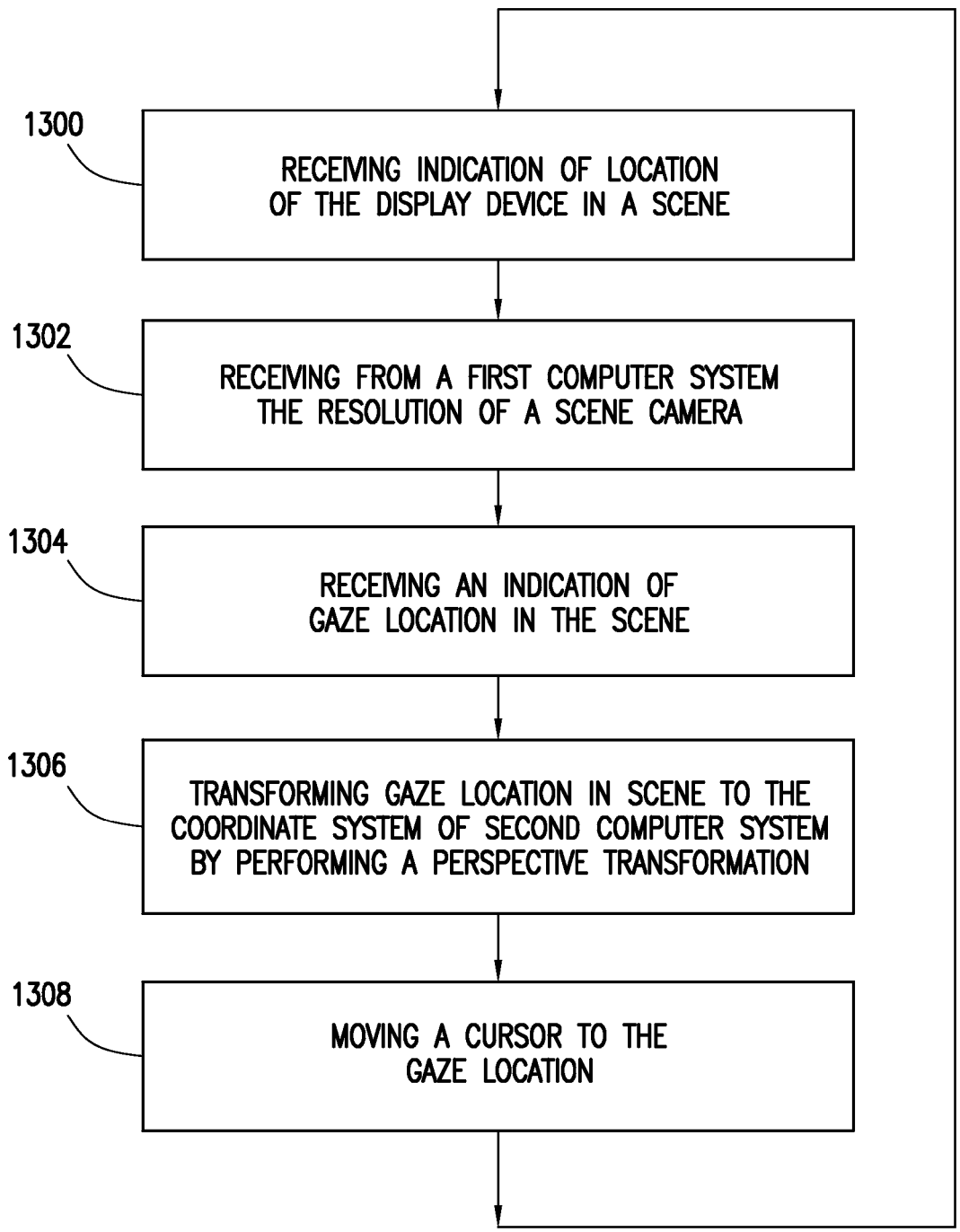
FIG. 13 shows a flow diagram of moving a cursor based on gaze location in accordance with at least some embodiments.

FIG. 13 shows a method that may be implemented on a second computer system (i.e., the computer system on which the cursor is to be controlled), and which method may be implemented in software executing on the processor of the second computer system. In particular, the example method begins by receiving an indication of the location of the display device within a scene (block 1300). For example, the second computer system may receive the four pixel locations representing the four corners of the display device sent from processor 716. Next, the example method receives an indication of the resolution of the scene camera of the scene (block 1302), and receives an indication of the gaze location within the scene (block 1304). From the information provided from the headset system 102, the example method may then comprise transforming gaze location in the scene to the coordinate system of the second computer system (i.e., the coordinate system of the display device) by performing a perspective transformation (block 1306). Finally, the second computer system then moves the cursor to the indicated gaze location on the display device (block 1308). In most cases, the example method then begins anew with receiving information from the headset system 102 (again blocks 1300, 1302, etc.) In example systems, the combination of the headset system 102 making gaze location determinations, and the second computer system receiving gaze the gaze location data (and other information) may implement cursor movement control in real-time with the pupil movement of the user.

Before proceeding, it is noted that the order of the various method steps in FIGS. 12 and 13 may be changed without adversely affecting operation of the headset system 102 and related second computer system (e.g., computer system 106). The various pieces of information used to perform the perspective transformation may be sent and/or received in any order, and thus FIGS. 12 and 13 shall not be read to imply a precise order of the steps.

Head Position Determination

The specification now turns to a discussion regarding calibration and measuring a user's head movement. In the example systems, in addition to eye movement (e.g., pupil center position tracking), head movement is may also be tracked. In example systems the headset 108 may comprise a six-axis gyroscope 248 (e.g., a combination accelerometer and gyroscope). Thus, head orientation and movement, including yaw, pitch and roll, may be ascertained.

In example systems, a user undergoes the calibration of gaze location as discussed above, and a homography is created. For purposes of the discussion from this point forward in the specification, the homography related to gaze location will be referred to as the gaze location homography. With the gaze location homography created, the user is next asked to perform head movement while continuing to keep gaze at a calibration feature on the display device for a period of time (e.g. five seconds). In one embodiment, the calibration feature may be the last of the calibration features discussed above. During the time the user is gazing at the calibration feature and performing head movement, the system collects two-dimensional directional vector data indicating head movement (e.g., collects from the six-axis gyroscope 248).

After the head movement data is collected, the processor 716 calculates a second homography, termed herein a head homography, which relates head position to pupil center position. The head homography is created from two sets of values comprising five two-dimensional head directions and the corresponding two-dimensional pupil center positions in the image from eye camera 402.

The five two-dimensional head directions are:

X Y (1)

+X +Y (2)

+X −Y (3)

−X +Y (4)

−X −Y (5)

Where X Y (1) represents the initial head position of the user; −X is a minimum value for X; +X is a maximum value for X; −Y is a minimum value for Y; and +Y is a maximum value for Y.

The example systems implementing a gyroscope 248 may find use with computer programs that implement a first-person camera view on the display device, such as in a first-person shooter game. In particular, the processor 716 may periodically (e.g., once each frame of the eye camera) measure head movement by recording data from the six-axis gyroscope 248. The measurement consists of three angles: yaw; pitch; and roll. The measurement is first subtracted from the value of an earlier measured three-dimensional head direction value that was recorded during calibration. The difference between the earlier measured three-dimensional head direction value and the last recorded measurement (i.e., the previously recorded frame) is calculated. If there is no last recorded measurement, then the current frame calculation is the measured value.

The processor 716 may then send a value or set of values to the second computer system representing the change or difference in head position. Based on the head position, or change in head position) determined, the second computer system implementing the first-person camera may move the first-person camera view on the display device based on the difference between the earlier measured three-dimensional head direction value and the last recorded measurement. Stated more directly, when using the described system with computer programs showing first-person camera views on a display device, head movement by the user alone (and independent of eye movement) causes changes in the camera view on the display device. Other modes of first-person camera control may augment the head movement. For example, in a first-person shooter game environment, a player may wish to turn 180 degrees in the game without turning around in real life. Making a mouse movement, in addition to moving his eyes and head, may help accomplish this. In another embodiment, a supplementary instruction may be mapped to a key on an input device, such as a keyboard.

Eye Movement Mapping to in-Game Aim

As discussed above, the combination of the headset system 102 and the example computer system 106 can determine an absolute gaze location on the display device (independent of head position). The absolute gaze location on the display device may be translated into an aiming point for an in-game weapon, and if a player then shoots the weapon, it will "shoot" towards the user's absolute gaze location on the display device. In other words, the center point of an aim need not be the center point of the in-game camera view.

In the specification and claims, certain components may be described in terms of algorithms and/or steps performed by software that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiment," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principals and various embodiments of the present invention. Numerous variations and modifications will become apparent to those skilled in the art once the above disclosure is fully appreciated. It is intended that the following claims be interpreted to embrace all such variations and modifications.

What is claimed is:

1. A headset system comprising:
   a strap member that defines a parabolic shape, the strap member comprising a first distal end and a second distal end, and the parabolic shape of the strap member resides within a first plane;
   a first ear piece member coupled to the first distal end of the strap member, and the first ear piece member comprising a speaker;
   an arm member coupled to the strap member, the arm member defines a proximal portion, a medial portion, a distal portion, and a central axis, the arm member extends away from the first plane and an angle formed between the central axis and the first plane is adjustable;
   a reflective surface disposed on the distal portion of the arm member;
   an eye camera coupled to the medial portion of the arm member, the eye camera having a viewing direction toward the reflective surface;
   a scene camera coupled to the arm member, the scene camera viewing direction away from the plane defined by the parabolic shape of the strap member; and
   a light system disposed on the distal portion of the arm, the light system having a beam direction toward the first plane within the parabolic shape of the strap member;
   wherein the scene camera viewing direction defines a center line, and a relationship between the center line and the central axis of the arm member is at least one selected from the group consisting of: parallel; between 0 degrees and about 30 degrees; about 10 degrees; and
   wherein the scene camera is disposed on the medial portion of the arm member.

2. The headset system of claim 1, further comprising:
   an electronics enclosure that defines an interior volume;
   a processor disposed within the interior volume;
   a memory coupled to the processor and disposed within the interior volume;
   a battery coupled to the processor and disposed within the interior volume; and
   a cable that communicatively couples the eye camera and scene camera to the processor.

3. The headset system of claim 1, wherein the arm member coupled to the first ear piece, and the angle formed between the central axis and the first plane is adjustable in only one degree of freedom.

4. The headset system of claim 1, wherein the reflective surface defines a second plane and defines a center of the reflective surface, and wherein a distance between the central axis of the arm member and a line normal to the second plane at the center of the reflective surface is between about 1 to 3 inches.

5. The headset system of claim 1, wherein the reflective surface is circular and has a diameter of between 0.5 and 1.25 inches.

6. The headset system of claim 1, wherein the reflective surface is at least one selected from the group consisting of: transparent plastic; transparent glass; and glass mirror.

7. The headset system of claim 1, wherein an area of view of the scene camera does not include the reflective surface.

8. The headset system of claim 1, wherein the light system further comprises at least one light emitting diode that produces light at a wavelength of about 850 nanometers.

9. The headset system of claim 1, wherein the light system further comprises at least one light emitting diode that produces light having between about 50 to about 250 milliwatts of luminous power.

10. The headset system of claim 1, wherein the light system further comprises:
    a first light emitting diode (LED) that, when activated, defines a first beam pattern with a first center line; and
    a second LED co-located with the first LED, the second LED, when activated, defines a second beam pattern with a second center line;
    wherein an angle formed between the central axis of the arm member and each of the first and second center lines is about 45 degrees.

11. The headset system of claim 10, further comprising a gyroscope disposed within the first ear piece member.

12. A headset system comprising:
    a strap member that defines a parabolic shape, the strap member comprising a first distal end and a second distal end, and the parabolic shape of the strap member resides within a first plane;
    a first ear piece member coupled to the first distal end of the strap member, and the first ear piece member comprising a speaker;
    an arm member coupled to the strap member, the arm member defines a proximal portion, a medial portion, a distal portion, and a central axis, the arm member extends away from the first plane and an angle formed between the central axis and the first plane is adjustable;
    a reflective surface disposed on the distal portion of the arm member;
    an eye camera coupled to the medial portion of the arm member, the eye camera having a viewing direction toward the reflective surface;
    a scene camera coupled to the arm member, the scene camera viewing direction away from the plane defined by the parabolic shape of the strap member; and
    a light system disposed on the distal portion of the arm, the light system having a beam direction toward the first plane within the parabolic shape of the strap member, wherein the light system further comprises:

a first light emitting diode (LED) that, when activated, defines a first beam pattern with a first center line; and a second LED co-located with the first LED, the second LED, when activated, defines a second beam pattern with a second center line;

wherein an angle formed between the central axis of the arm member and each of the first and second center lines is about 45 degrees; and wherein an angle formed between the first center line and the second center line is about 45 degrees.

* * * * *